United States Patent [19]
Vosbeck et al.

[11] Patent Number: 4,990,121
[45] Date of Patent: Feb. 5, 1991

[54] ROLLING MILL DRIVE HAVING A SPINDLE WITH CURVED TOOTHING

[75] Inventors: Heinz Vosbeck, Hilchenbach; Gerhard Artel, Kirchhundem; Jürgen Stelbrink, Hilchenbach, all of Fed. Rep. of Germany

[73] Assignee: SMS Schloemann-Siemag Aktiengesellschaft, Dusseldorf, Fed. Rep. of Germany

[21] Appl. No.: 298,069

[22] Filed: Jan. 17, 1989

[30] Foreign Application Priority Data

Jan. 15, 1988 [DE] Fed. Rep. of Germany ....... 3800999
Apr. 8, 1988 [DE] Fed. Rep. of Germany ....... 3811790

[51] Int. Cl.$^5$ .......................... F16D 3/18; B21B 35/14
[52] U.S. Cl. ...................................... 464/16; 464/156; 464/159
[58] Field of Search .................. 464/16, 156, 158, 159

[56] References Cited

U.S. PATENT DOCUMENTS

| | | | |
|---|---|---|---|
| 2,845,781 | 8/1958 | O'Brien | 464/156 |
| 2,867,100 | 1/1959 | Beecher | 464/16 X |
| 2,909,045 | 10/1959 | Burns | 464/156 |
| 3,126,722 | 3/1964 | Kramer et al. | 464/16 |
| 3,298,198 | 1/1967 | Winkler | 464/159 X |
| 3,299,670 | 1/1967 | Allbeson et al. | 464/156 |

FOREIGN PATENT DOCUMENTS

| | | |
|---|---|---|
| 1209535 | 9/1960 | Fed. Rep. of Germany . |
| 2454036 | 5/1976 | Fed. Rep. of Germany . |
| 2824895 | 2/1979 | Fed. Rep. of Germany . |
| 3706577 | 9/1988 | Fed. Rep. of Germany . |

Primary Examiner—Daniel P. Stodola
Attorney, Agent, or Firm—Toren, McGeady & Associates

[57] ABSTRACT

A rolling mill drive with axially slidable spindles arranged between drive shafts and drive rolls, particularly between driven necks of pinions and drive necks of rolls. The spindle heads of each spindle are each provided with a wobbler with a curved toothing and coupling sleeve having an internal toothing surrounding the wobbler. The coupling sleeve is connected to the pinion neck or to the roll neck. The spindle is guided between the coupling sleeves by means of at least one support element arranged in the region of the spindle axis and an axially adjustable pressure plunger. The internal toothing of the coupling sleeve extends beyond the curved toothing of the wobbler and has at least a supporting length which corresponds to the length of the possible axial displacement of the spindle.

7 Claims, 3 Drawing Sheets

ROLLING MILL DRIVE HAVING A SPINDLE WITH CURVED TOOTHING

BACKGROUND OF THE INVENTION

1. Field of the Invention

The present invention relates to a rolling mill drive with axially slidable spindles arranged between the drive shafts and driven rolls, particularly between driven necks of pinions and drive necks of the rolls. The spindle heads of each spindle are each provided with a wobbler with a curved toothing and a coupling sleeve having an internal toothing surrounding the wobbler. The coupling sleeve, in turn, is connected to the pinion neck or the roll neck. The spindle is guided between the coupling sleeves by means of at least one support element arranged in the region of the spindle axis and an axially adjustable pressure plunger.

2. Description of the Related Art

In modern rolling mills it is required to accelerate the rolling work and to increase the rolling accuracy and the rolling speed. In order to compensate any possibly occurring errors in planeness of the rolled material, for example, the work rolls of the rolling mill stand are axially displaced within certain adjustment ranges, so that arching of the strip in the center and at the edges can be advantageously influenced in a controlled manner. For this purpose, a suitable adjusting drive effects the translatory displacement of the work rolls by precisely predetermined distances in the rolling mill stand, while the rotary drive of the work rolls is effected in the known manner by means of spindles which are arranged between the driven work rolls and the driving pinions. Since the pinions are mounted in stationary stands and are in turn connected through suitable gear assemblies to drive motors, the spindles must be constructed in such a way that, on the one hand, they can compensate the displacement of the work rolls in the rolling mills and that, on the other hand, they can transmit the full drive power from the pinions to the work rolls.

For the foregoing reasons, in an older patent application No. P 37 06 557.7, it has been suggested in a spindle of the above-described type to construct the spindle at the end facing the pinion in such a way that the wobbler with the curved toothing is a long sleeve which is slid over a substantial portion of the spindle shaft and wherein the inner surface of the wobbler and the outer surface of the spindle shaft has longitudinally directed toothings which are capable of meshing, for example, a key and groove connection. The length of the toothings is at least such that the entire adjustment distance of the work roll can be compensated.

However, the angular displacement of the spindles is carried out in the known manner in the spindle joint which is formed by the curved toothing of the wobbler and the internal toothing of the coupling sleeve. These structural measures for the longitudinal compensation of the spindle and for adjusting the spindle to the position assumed by the work rolls have been found in practice to be reliable and useful in many situations. However, it was found that great frictional forces in the toothings had to be taken into consideration when the wobbler was displaced on the spindle sleeve.

It is, therefore, the primary object of the present invention to improve the rolling mill drive of the above-described type in several respects. The machine elements for effecting the translatory displacement and for the vertical angular compensation of the spindle are to be structurally simple and simple to manufacture. In addition, the frictional forces to be overcome during displacement of the spindle are to be significantly reduced. Moreover, a problem-free lubrication of the spindle joint and an efficient removal of the frictional heat from the joint are to be ensured.

SUMMARY OF THE INVENTION

In accordance with the present invention, the internal toothing of the coupling sleeve extends beyond the curved toothing of the wobbler and has at least a supporting length which corresponds to the length of the possible axial displacement of the spindle.

As a result of the structural measure according to the present invention, the spindle joint with curved toothing makes possible the axial displacement of the spindle within a wide range, in addition to the angular adjustment of the spindle in the vertical plane to different strip thicknesses of the rolled material and the adjustment to the existing wear conditions of the work rolls. Accordingly, the spindle joint carries out several functions in a single unit which is structurally simple and substantially less expensive to manufacture. Additional advantages are a significant reduction of the adjustment forces which must be applied during displacement against the frictional forces.

Compared to the known construction for effecting the displacement of the spindle with a longitudinally directed outer toothing on the spindle periphery and a corresponding inner toothing in the bore of the wobbler, the moments to be transmitted by the spindle act at a radially greater distance from the spindle axis, so that the forces occurring in the engaged coupling during the displacement are substantially reduced. The supporting length of the inner toothings of the coupling sleeves are to compensate at least the full adjustment distance of the driven rolls to be displaced, wherein the spherical toothing of the wobbler may be dimensioned in accordance with the conventional design data.

In accordance with a feature of the present invention, the inner toothing of the coupling sleeve extends beyond the curved toothing of the wobbler by a length which corresponds to at least half the length of the possible axial displacement of the spindle. This provides the advantage that the entire desired adjustment distance is compensated such that each coupling sleeve compensates half of the entire distance, so that the inner toothing of the coupling sleeve extending through the curved toothing can be dimensioned as short as possible.

In accordance with another feature of the present invention, the inner toothing of the coupling sleeve is formed by an annular toothed element which is rigidly connected to the inner wall of the coupling sleeve, the rigid connection being effected by a frictional and/or positive engagement. This measure according to the present invention makes possible an inexpensive manufacture of the coupling sleeve as well as of the toothed element. Furthermore, the assembly becomes simpler and the toothed element can be exchanged inexpensively and quickly in the case of damage to the teeth or wear of the teeth.

In accordance with yet another feature of the present invention, the axis of the wobbler and the axis of the coupling sleeve include a preselected angle of deflection. As a result, the frictional forces which could act against an axial displacement are substantially reduced.

Since the spindle joints can reach the angle 0° in the vertical plane when the rolls are vertically adjusted, which results in increased frictional forces, an angle of deflection outside of the vertical plane is used to counteract the increase of the frictional forces. This angle of deflection is preferably constant and ranges between 0° and 1; in other words, an angle of deflection of a few tenths of a degree is sufficient for reducing the frictional forces. The angle of deflection is advantageously formed by an axial offsetting or displacement fixedly adjusted in the horizontal plane between the driven neck of the pinion and the drive neck of the roll.

In accordance with a further proposal according to the present invention, the support elements and pressure plungers are arranged in the region of the heads of the spindle. The plunger head of each pressure plunger is spherically shaped and each coupling sleeve has a correspondingly shaped countersurface. Springs are provided on each pressure plunger, so that the pressure plunger exerts a spring force against the countersurface of the coupling sleeves.

In accordance with another feature, the pressure plungers are each mounted in a guide sleeve coaxially relative to the spindle axis and have such a length that the possible axial adjustment thereof corresponds to at least half the possible axial displacement of the spindle. Thus, due to the force of the spring, the pressure plunger follows the displaced coupling sleeve of the spindle without delay and dimensionally exact and, consequently, the plunger follows the countersurface connected to the sleeve, so that an exact guidance and axial centering of the spindle between the coupling sleeves is ensured in any position of the spindle.

In accordance with an advantageous feature of the invention, the countersurface, the pressure plunger and the springs are constructed equally at both spindle heads and the springs are constructed with the same spring force, so that the structural components are standardized and the costs of the components are reduced.

In accordance with a special development of the invention, the rotating coupling sleeve extends beyond the inner toothing connected to the sleeve and has at its end facing toward the spindle head a labyrinth-type seal whose other sealing elements are connected to an oil housing which is rotatably mounted on the coupling sleeve and is provided with an oil discharge. In the multi-functional unit formed by the curved toothing of the wobbler and the inner toothing of the coupling sleeve, frictional heat is generated due to translatory displacement of the spindle, due to angular displacement of the spindle and due to the torques to be transmitted by the toothings. The proposed connection of the spindle joint to a housing containing oil ensures a problem-free lubrication of the spindle joint and a safe removal of the frictional heat.

In accordance with another proposal of the invention, a grooved oil supply ring surrounding the spindle shaft is provided in the stationary oil housing at least in the region of one of the heads. The groove of the oil supply ring is in open communication with an oil duct leading approximately radially from the outside toward the spindle axis. The oil duct ends in a central duct extending coaxially with the spindle axis. The central duct is at both spindle heads in oil-conducting communication with the pressure plunger, and the springs and with the head of the pressure plunger and the countersurface of the sleeve. As a result, all structural components of the spindle which are highly stressed by friction and forces are sufficiently supplied with lubricants.

In accordance with a further feature, in order to provide a circulating oil lubrication with all advantages of oil cooling and oil cleaning, an oil reservoir surrounding the plunger head and the countersurface is in open communication with the oil reservoir formed around the curved toothing of the wobbler and the inner toothing of the coupling sleeve and with the oil housings and with the oil supply ring.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DESCRIPTION OF THE PREFERRED EMBODIMENT

Figure 1:
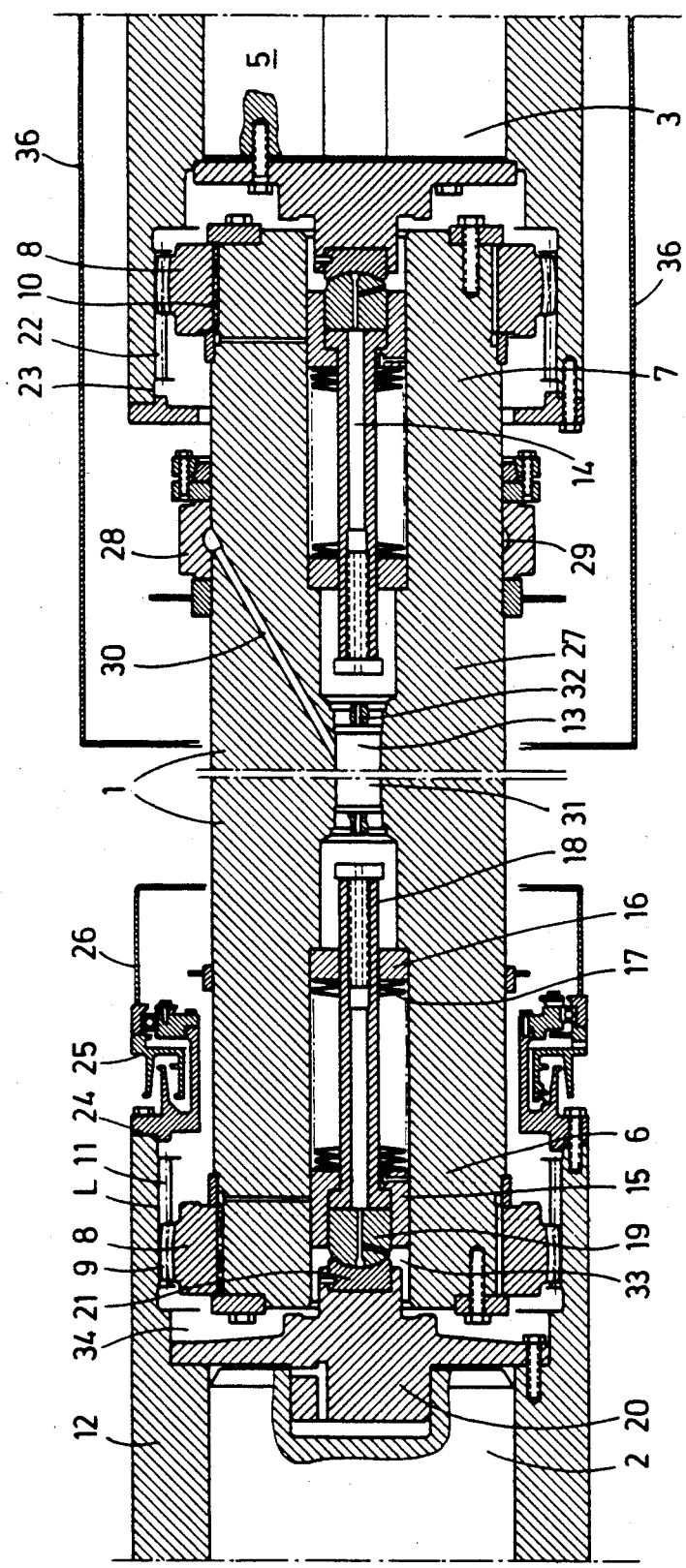
FIG. 1 is a longitudinal sectional view of the spindle of the rolling mill drive according to the present invention.

The rolling mill drive illustrated in FIG. 1 includes a spindle 1 which is arranged between the necks 2, 3 of a work roll 4 and a pinion 5, the work roll 4 and the pinion 5 not being illustrated in detail. The spindle 1 has at both ends thereof, i.e., in the regions of the spindle heads 6, 7 a wobbler 8 each which is provided with a curved toothing 9 and is fixedly mounted on the respective spindle head 6, 7, for example, by means of a key and groove connection 10 or a feather key or the like. Each wobbler 8 is surrounded by a coupling sleeve 12 provided with an inner toothing 11. The coupling sleeve 12 of the joint is fixedly connected to the neck 2 of the work roll 4 or the neck 3 of the pinion 5 so as to rotate therewith.

A pressure plunger 14 is arranged at both spindle heads 6, 7 in the region of the spindle axis 13. The pressure plungers 14 are guided in guide sleeves 15, 16 and are surrounded by a stack of plate springs 17 which rest against the guide sleeves. At its end facing the neck 2, 3, each pressure plunger 14 has a plunger head 19 whose diameter is greater than that of the plunger shaft 18. The end face of the plunger head 19 is spherically-shaped and interacts with a correspondingly-shaped countersurface 21 which is centrally formed in a support element 20 connected to the coupling sleeve 12. The pressure plunger 14 is axially displaceably held by means of the plate spring 17 which rest against one of the guide sleeves 16, so that the plunger head 14 and the countersurface 21 are continuously in effective connection due to the spring load. As a result, the spindle 1 is guided and adjusted between the necks 2, 3 of the work roll and the pinion.

The internal toothing 11 of the coupling sleeve 12 extends beyond the curved toothing 9 of the wobbler with such a supporting length L that the axial displacement of the spindle 1 is ensured. In the illustrated embodiment, the length L by which the internal toothing extends beyond the respective coupling sleeve 12 is dimensioned such that it corresponds at least to half the length of the entire necessary axial displacement X. As a result, it is ensured that each spindle joint is capable of compensating half the distance of adjustment of the work roll.

In addition, the two pressure plungers 14 arranged coaxially in the center of the spindle heads 6, 7 have such a length that the plunger shafts extend through the guide sleeves 16 and an axial displacement is ensured which corresponds to at least half the length of the axial displacement X of the spindle. As a result, it is ensured that the spindle remains exactly guided and adjusted during each change of the adjusting length X.

The inner toothing 11 of the coupling sleeve 12 advantageously consists of an annular toothed element 22 which is connected rigidly by means of a frictional and/or positive engagement, for example, by means of a key and groove connection, to the inner wall surface 23 of the coupling sleeve 12.

For a problem-free lubrication and cooling of the spindle joint, a circulating oil lubrication is provided which shall now be described. In the region of the spindle head 7 of the spindle 1, an oil supply ring 28 is arranged in a stationary oil housing 36. Oil supply ring 28 surrounds the spindle shaft 27 and has an inner annular groove 29 on the side facing the spindle shaft. The annular groove 29 is in open communication with an oil duct 30 which leads to the spindle axis. The oil duct 30 ends in a central duct 31 arranged coaxially in the spindle. The lubricating oil is supplied from the central duct 31 through a throttling oil connection 32 to the pressure plunger 14. The lubricating oil is supplied to the plate springs 17 in a suitable manner. The effective surface formed between the plunger head 19 and the surface 21 is supplied with lubricating oil through a duct 35 arranged in the plunger shaft 18. The lubricating oil is subsequently collected in a reservoir 33 and is conducted from reservoir 3 into another reservoir 34 in which the curved toothing 9 of the wobbler and the inner toothing 11 of the coupling sleeve 12 mesh each other.

The oil reservoir 34 is connected to an oil housing 26 which is rotatably mounted on the coupling sleeve and is provided with an oil discharge. The rotating coupling sleeve 12 has a labyrinth-type seal 25, the other sealing elements of which are connected to the housing. The circulating oil lubrication ensures a problem-free supply of lubricant to all lubricating points of the spindle and the necessary discharge of frictional heat from the spindle joint.

Figure 2:
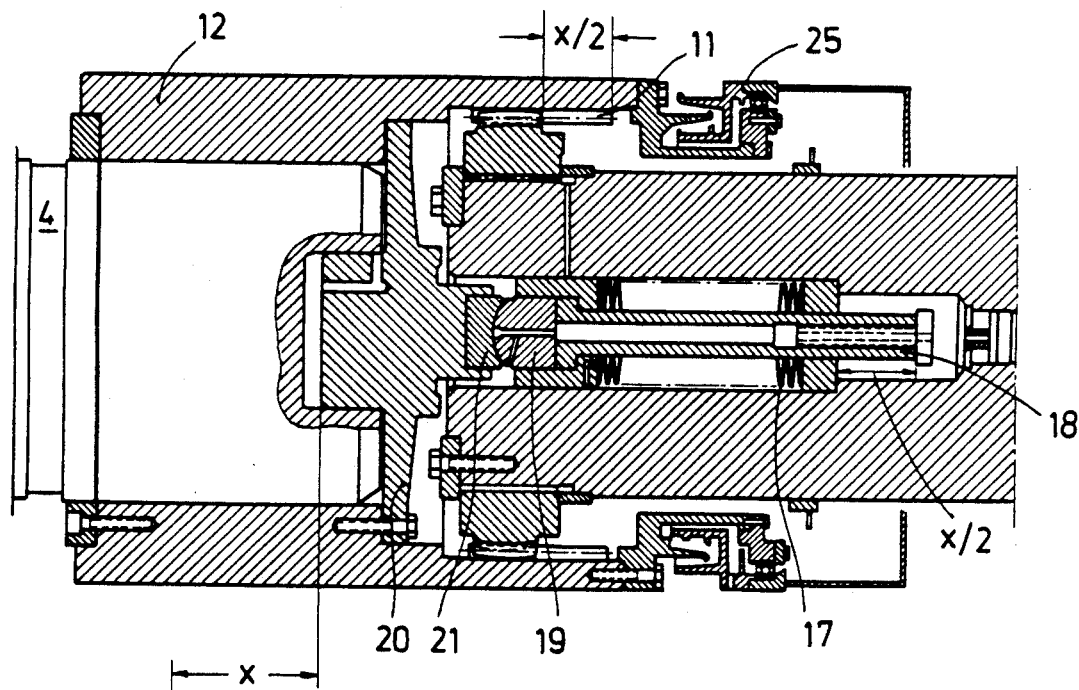
FIGS. 2 and 3 are sectional views of the spindle joint facing the work roll, the spindle joint being shown in different positions of adjustment.
Figure 3:
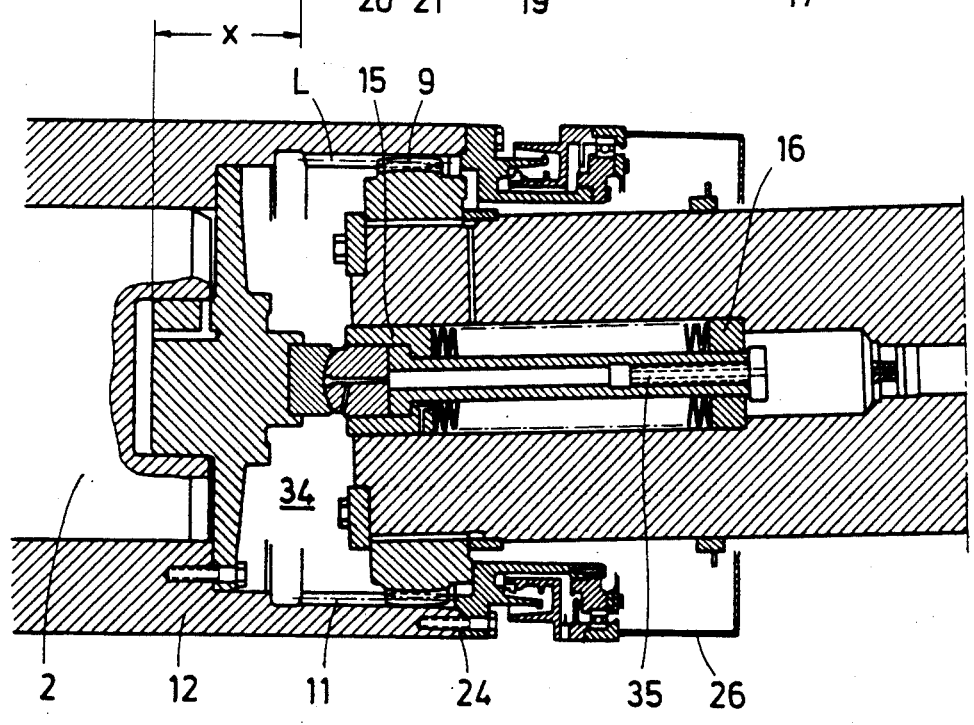

FIGS. 2 and 3 of the drawings show two positions of adjustment of the spindle joint. As shown in FIG. 2, the neck 2 of the work roll 4 is in a position in which it is as far as possible moved toward the right against the spindle. In FIG. 3, on the other hand, the neck 2 of work roll 4 is in a position in which it is moved as far as possible to the left from the spindle. The entire adjusting distance of the neck 2 and, thus, the entire adjusting distance of the work roll 4 is compensated by the curved toothing 9 of the wobbler 8 and by the inner toothing 11 of the coupling sleeve 12.

As can be seen in the drawing, the length L of the inner toothing 11 of the coupling sleeve 12 extending beyond the curved toothing 9 is dimensioned such that it corresponds at least to half the length of the possible axial displacement X of the spindle. As the drawing also shows, the possible displacement of the plunger 14 movably guided in the guide sleeves 15, 16 corresponds to at least half the length of the possible axial displacement X of the spindle. The other half of the adjusting distance is compensated by the second spindle joint which, as is clear from FIG. 1, structurally corresponds to the first spindle joint.

Figure 4A:
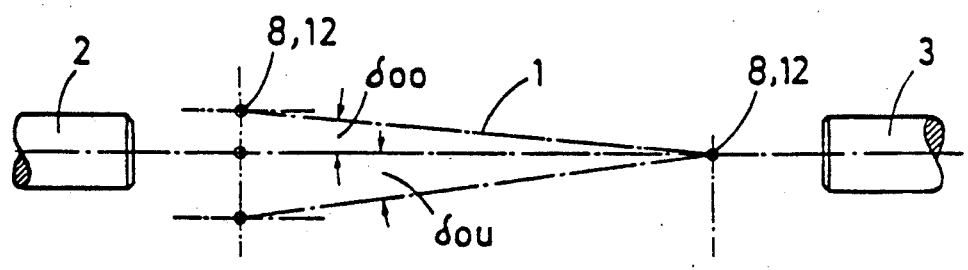
FIGS. 4a and 4b are schematic illustrations of the vertical angular displacement of the drive neck of the roll.
Figure 4B:
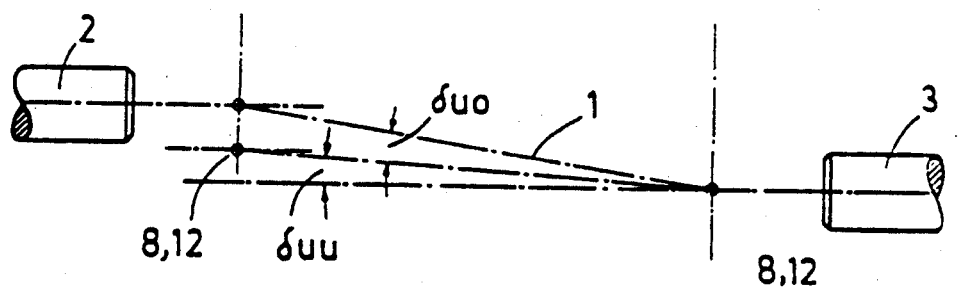

FIGS. 4a and 4b of the drawing are schematic illustrations of the vertical displacement of the work rolls in the rolling mill stand. Specifically, the neck 2 of the upper work roll is displaceable upwardly by the angle $\delta_{oo}$ and downwardly by the angle $\delta_{ou}$, while the neck 2 of the lower work roll is displaceable by the angles $\delta_{uo}$ or $\delta_{uu}$ in the vertical direction, depending upon the thickness of the rolling material and the adjustment of the rolls. The angular displacement of the work rolls is additionally changed when the work rolls, or the roll necks 2 shown in the drawing are displaced axially relative to each other. The axial as well as the vertical displacement of the work rolls are compensated by the spindle joint, i.e., by the wobbler 8 and the coupling sleeve 12 of the spindle 1.

Figure 4C:
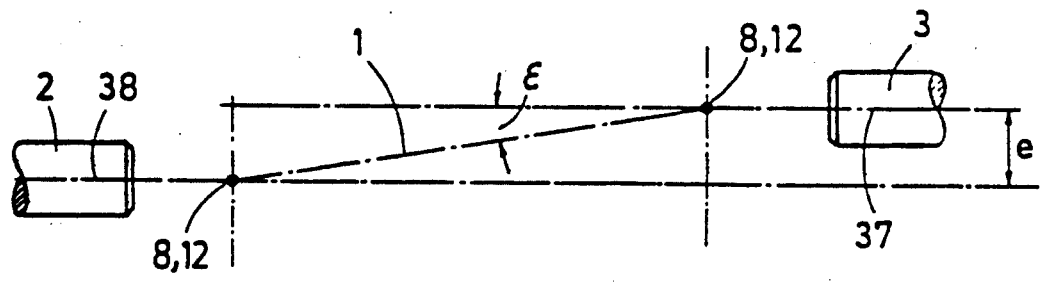
FIG. 4c is the schematic illustration of the horizontal axial displacement between pinion neck and roll neck.

In order to significantly reduce the frictional forces which occur at the inner toothing 11 of the coupling sleeve 12 and which counteract the axial displacement of the rolls, the axis 37 of the pinion or of the neck 3 thereof is displaced in the horizontal plane by the distance e relative to the axis 38 of the work roll or of the neck 2 thereof, as illustrated in FIG. 4c. The axis of the spindle 1 and the axes of the neck 3 and of the neck 2 include angle $\epsilon$. Therefore, for structural reasons, the axis of the wobbler is displaced relative to the axis of the coupling sleeve by this angle $\epsilon$, wherein a few tenths of a degree represent a sufficient minimum in order to be able to significantly reduce the above-mentioned frictional forces occurring due to the rotation with the angle of deflection. The total angle of deflection can be determined by means of conventional computational methods wherein the vertical angle of displacement $\delta$ (FIGS. 4a and 4b) and the horizontal angle of deflection $\epsilon$(FIG. 4c) are used in this computation.

While a specific embodiment of the invention has been shown and described in detail to illustrate the application of the inventive principles, it will be understood that the invention may be embodied otherwise without departing from such principles.

We claim:

1. In a rolling mill drive including a spindle having an axis and being arranged between a driven neck of a pinion and a drive neck of a roll, the spindle being axially slidable along a length of possible displacement, the spindle having two ends and a head at each end of the spindle, each spindle head being provided with a wobbler having a curved toothing, a coupling sleeve at each end of the spindle, each coupling sleeve having an internal toothing surrounding the wobbler, the coupling sleeve being connected to the neck, the spindle being guided between the coupling sleeves by means of at least one support element arranged in the region of the spindle axis and an axially adjustable pressure plunger, the wobbler and the coupling sleeve each having an axis, wherein the improvement comprises that the axis of the wobbler and the axis of the coupling sleeve in the horizontal plane include a preselected angle of deflection which is at least a few tenths of a degree.

2. The rolling mill drive according to claim 1, wherein the deflection angle is constant and is no greater than 1°.

3. The rolling mill drive according to claim 1, comprising a support element and a pressure plunger at each end of the spindle, the support elements and the pressure plungers being arranged in the region of each head of the spindle, each plunger having a head, the plunger head of each pressure plunger being spherically shaped and each coupling sleeve having a correspondingly shaped countersurface, springs being provided on each pressure plunger, so that each pressure plunger spring force against the countersurface of the coupling sleeve.

4. The rolling mill drive according to claim 3, wherein each pressure plunger is mounted in a guide sleeve arranged coaxially relative to the spindle axis, each pressure plunger having such a length that the possible axial adjustment thereof corresponds to at least half the possible axial displacement of the spindle.

5. The rolling mill drive according to claim 3, wherein the countersurface, pressure plunger and the springs at each spindle head are of equal constructional and the spring force of the springs at the two spindle heads are equal.

6. The rolling mill drive according to claim 1, wherein the internal toothing of the coupling sleeve extends beyond the curved toothing of the wobbler and has at least a supporting length which corresponds to the length of the possible axial displacement of the spindle.

7. The rolling mill drive according to claim 1, wherein the angle of deflection is formed by the driven neck of the pinon being axially offset by a fixed extent in the horizontal plane relative to the drive neck of the roll.

* * * * *